W. T. DELONY.
DIRIGIBLE HEAD LAMP.
APPLICATION FILED MAY 23, 1917.
1,241,348.
Patented Sept. 25, 1917.
2 SHEETS—SHEET 1.
Fig. 1.
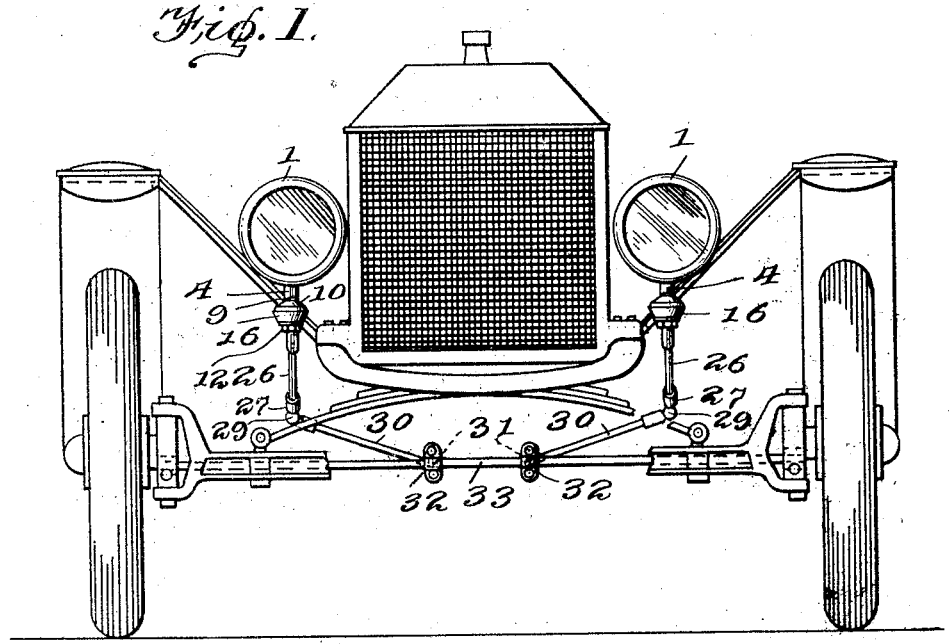
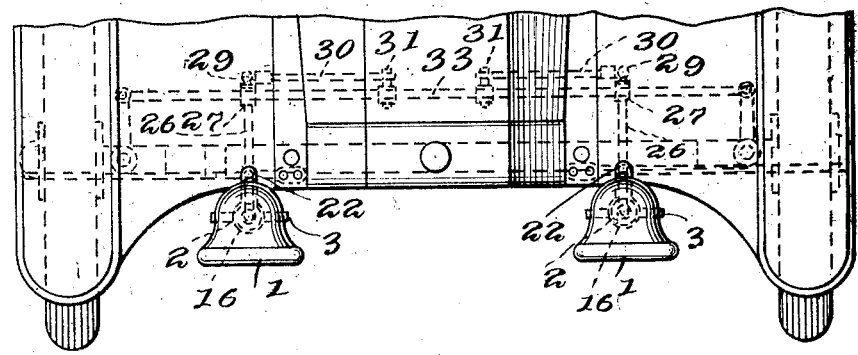
Fig. 2.
WITNESSES
H. N. Lybrand
P. M. Smith
INVENTOR
W. T. Delony
BY Victor J. Evans
ATTORNEY W. T. DELONY.
DIRIGIBLE HEAD LAMP.
APPLICATION FILED MAY 23, 1917.
1,241,348.
Patented Sept. 25, 1917.
2 SHEETS—SHEET 2.
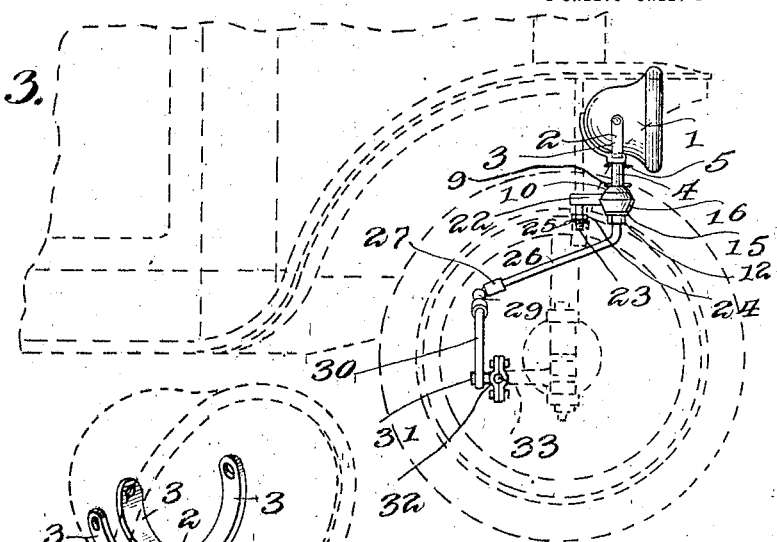
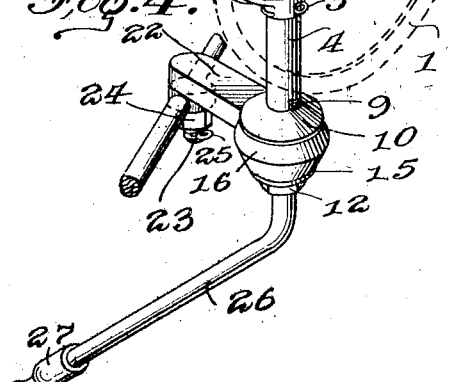
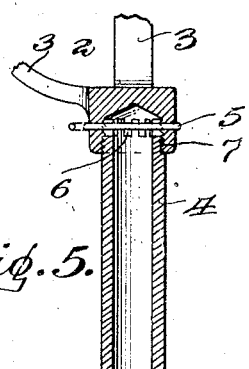
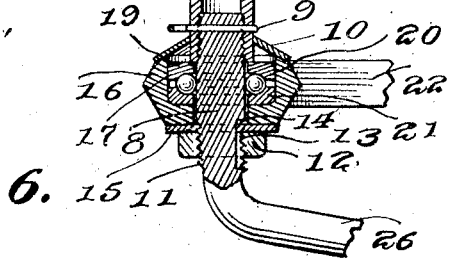
WITNESSES
H. N. Lybrand
P. M. Smith
INVENTOR
W. T. Delony
BY Victor J. Evans
ATTORNEY

UNITED STATES PATENT OFFICE.

WILLIAM T. DELONY, OF CASTLEBERRY, ALABAMA.

DIRIGIBLE HEAD-LAMP.

1,241,348.  Specification of Letters Patent.  Patented Sept. 25, 1917.

Application filed May 23, 1917. Serial No. 170,517.

*To all whom it may concern:*

Be it known that I, WILLIAM T. DELONY, a citizen of the United States, residing at Castleberry, in the county of Conecuh and State of Alabama, have invented new and useful Improvements in Dirigible Head-Lamps, of which the following is a specification.

This invention relates to dirigible head-lamps, the object in view being to provide in connection with the steering mechanism of a motor vehicle, one or more headlamps mounted to turn on substantially vertical axes and so connected with a member of the steering mechanism that said lamp or lamps are automatically turned at angles corresponding with the angles of the steering wheels of the machine, thereby illuminating that portion of the road-way about to be followed by the machine.

One of the principal objects of the present invention is to so construct and combine the several members of the lamp turning mechanism, and the supporting means therefor, that said parts may be readily associated and disassembled and also adjusted to take up wear and prevent rattling.

With the above and other objects in view, the invention consists in the novel construction, combination and arrangement of parts, herein fully described, illustrated and claimed.

In the accompanying drawings:—

Figure 1 is a front elevation of a sufficient part of a motor vehicle to illustrate a pair of dirigible headlamps in their applied relation thereto.

Fig. 2 is a plan view of the same.

Fig. 3 is a side elevation thereof.

Fig. 4 is a perspective view of one lamp, showing the supporting and operating mechanism therefor.

Fig. 5 is an enlarged section taken through the supporting bracket or lamp post bearing, showing the certain parts in elevation.

Fig. 6 is a view illustrating another form of lamp holding fork.

Ordinarily in automobile practice, two headlamps are employed at the front of the machine, but in view of the fact, that, under the present invention, both of said lamps are identical in construction as well as the supporting and operating means therefor a description of one lamp and its supporting and operating means will answer for both.

As shown in the drawings, the lamp designated at 1 is supported by means of a fork 2 which is shown in one form as embodying three or more arms 3 which are riveted or otherwise fastened to the casing of the lamp. Under a modified form of lamp fork, only two arms 3' are used as illustrated in the modified view Fig. 6. The lamp holding fork 2 is fastened to the upper end of the upper tubular section 4 of a lamp post, the parts 2 and 3 being fitted one upon the other and connected in fixed relation to each other by means of a key or pin 5 inserted diametrically therethrough. The upper edge of the post section 4 is castellated or formed with a circular series of notches 6 to receive the pin or key 5, thus enabling the lamp holding fork to be adjusted relatively to the lamp post section 4 in order to throw the rays of light directly ahead or slightly inward or outward according to the desire of the operator, when the steering wheels are in a straight forward direction. The post section 4 is threaded as shown at 7 and the lamp holding fork is correspondingly threaded to screw thereon as shown in Fig. 5.

The lower end of the post section 4 is internally threaded to receive the threaded upper end of a lower post section 8 and a pin or key 9 is inserted diametrically through the last named parts when the proper adjustment has been obtained. The post section 4 has surrounding its lower end a conical flange 10 which fits over the lamp post bearing hereinafter described and excludes water, dust, dirt and other foreign matter therefrom. The lower post section 8 is reduced and threaded at 11 to receive a nut 12 located below the lamp post bearing and the threaded portion 11 of the post section 8 is formed with a longitudinal groove 13 to receive an inwardly extending lip 14 on a washer 15 which is interposed between the bottom of the lamp post bearing and the retaining nut 12.

The supporting bracket or lamp post bearing is indicated at 16 and is of tubular formation, being formed with a vertical bore to receive the lamp post section 8. The bearing 16 is counterbored at 17 to receive a ball race or cup 19 which is inserted in the counterbore 17 and which contains a circular series of anti-friction balls 20. 21 designates another ball bearing cup which surrounds the post section 8 below the cup 21. The dirt guard or flange 10 of the upper post section 4 fits over and covers the ball bearing just described and excludes foreign matter therefrom. The bearing 16 comprises a supporting arm 22 from which extends an attaching stud 23 the extremity of which is threaded to receive a nut 24, the stud 23 being inserted through a hole in the frame of the machine and the connection therewith being made secure by means of the nut 24, the escape of which is prevented by means of a key or pin 25 inserted diametrically through the stud 23.

The reduced portion of the lower post section 8 is deflected or extended laterally to form a lamp turning arm 26 the extremity of which is threaded and has screwed thereon a thimble 27 provided at its outer end with a spherical enlargement or ball 28 which is received in a socket member 29 screwed or otherwise fastened upon one end of a link rod 30. The other end of the link rod 30 is connected by a pivot 31 to a clamp or band 32 which extends around the connecting rod 33 which couples together the steering knuckle arms of the motor vehicle.

From the foregoing description taken in connection with the accompanying drawings it will now be understood that when the steering wheels of the machine are turned to one side or the other, a corresponding turning movement is automatically imparted to the headlamp or lamps. Either style of lamp holding fork hereinabove described may be utilized in connection with the upper lamp post section 4. The ball and socket joint connecting the lamp turning arm 26 and the link rod 30, admits of the necessary relative up and down movement between the front axle and the body or frame of the vehicle. Wear is readily compensated for by means of the ball bearing between the lamp post and the supporting bracket. The supporting bracket is readily attached to any machine either at the time of manufacture or subsequently thereto. The device as a whole is applicable to nearly all makes of motor vehicles, requiring only the boring of a hole through the frame to receive the stud 23.

I claim:—

In a dirigible headlamp for motor vehicles, the combination of a bearing bracket embodying a lamp supporting arm, said bearing bracket being formed with a vertical bore and being counterbored to receive a ball bearing, a ball bearing inserted in the counterbore of said bracket, a lamp post extending through the bore of the bearing portion of said bracket and comprising upper and lower sections having a threaded and adjustable connection with each other above said ball bearing, a lamp turning arm extending at an angle to the lower lamp post section and connected with an element of the steering mechanism, and a nut threaded on said lower lamp post section and bearing against the bottom of said bracket, said nut and the threaded adjustment between the upper and lower lamp post sections providing means for taking up wear in the ball bearing.

In testimony whereof I affix my signature.

WILLIAM T. DELONY.